United States Patent Office 3,558,727
Patented Jan. 26, 1971

3,558,727
PRODUCTION OF HEXABROMO-
CYCLODODECANE
Herbert Jenkner and Otto Königstein, Cologne-Deutz,
Germany, assignors to Chemische Fabrik Kalk
G.m.b.H., Cologne-Kalk, Germany
No Drawing. Filed Mar. 18, 1968, Ser. No. 714,011
Claims priority, application Germany, May 12, 1967,
C 42,327
Int. Cl. C07c 13/02, 17/02
U.S. Cl. 260—648                                    6 Claims

ABSTRACT OF THE DISCLOSURE

Method of producing hexabromocyclododecane by reacting cyclododecatriene with bromine in the presence of polar solvents wherein the cyclododecatriene and the bromine are introduced into the solvent at spatially separated locations and the reaction mixture is vigorously stirred.

BACKGROUND OF THE INVENTION

The invention relates to an improved process for the production of hexabromocyclododecane by reaction of cyclododecatriene with bromine.

It is known that hexabromocyclododecane can be produced by the addition of bromine to 1,5,9-cyclododecatriene, the reaction advantageously being carried out in polar solvents. As shown in Dokl. Adak. Nauk. SSSR, vol. 132, No. 5 (1960), pages 658 to 660 of the English translation, only low yields are obtained with this method. In German Pats. No. 1,147,574 and No. 1,147,575 and German Auslegeschrifts No. 1,222,049 and No. 1,227,-012, it is also reported that resin-like by-products are formed in the bromination of cyclododecatriene and therefore yields of only from 57 to 65% of the theoretical yields of hexabromocyclododecane are obtained. In addition, this hexabromocyclododecane is often grey in appearance so that it must be further purified before its technical utilization. According to German Pat. No. 1,147,574, the bromination is carried out in the presence of halogen carriers in order to repress the secondary reactions occurring during the bromination process. However, in that case the yields rise to at most 87% but mostly to less than 80% of the theoretical yields. Also, the addition of the halogen carriers makes additional costly purification and drying steps necessary because of the required separation of the products produced by the destruction of the halogen carrier.

According to German Pat. No. 1,147,575, bromination of the cyclododecatriene is carried out in the presence of acid-binding agents. Even though this method provides somewhat higher yields than the method according to German Pat. No. 1,147,574, the same costly purification steps are necessary in the processing of the hexabromocyclododecane obtained as in the method according to German Pat. No. 1,147,574.

As disclosed in German Auslegeschrift No. 1,222,049, the yields in the above-mentioned methods can be improved by re-using the mother liquors accumulating in the bromination for a new operation. As, however, the examples of Auslegeschrift No. 1,222,049 further show, high yields in the overall method are only obtained when the addition of the first two-thirds of the quantity of bromine to the mixture comprised of polar solvent and cyclododecatriene is effected at temperatures of from 0 to 10° C. With this mode of operation, however, large amounts of energy are required for cooling as heat is liberated during the bromination. As, in addition, operating according to German Auslegeschrift No. 1,222,049 must generally be in the presence of halogen carriers or acid-binding agents, costly purification steps for the hexabromocyclododecane are again required. When this method is practiced on a large scale, and, particularly, if no halogen carriers are added to the reaction mixture in order to simplify processing, difficulties occur when from 30 to 50% by weight of the necessary bromine has been introduced into the reaction mixture. Viscous products are then formed which combine to form resin-like lumps and which are precipitated. These resin-like products can only be separated from the hexabromocyclododecane with difficulty and the formation of these products also causes a distinct reduction in the yield.

It is also indicated in German Auslegeschrift No. 1,227,012 that all previous methods yielded resin-like by-products and such Auslegeschrift concerns a processing method for such resin-like by-products with which further hexabromocyclododecane can in fact be obtained, but this is still contaminated by a filler.

SUMMARY OF THE INVENTION

The object of the invention is to provide a method for the production of hexabromocyclododecane in which the formation of undesired by-products and the necessity of using halogen carriers are eliminated.

According to the invention it was found that this object could be achieved by a method, involving a reaction between cyclododecatriene with bromine in a polar solvent, wherein the cyclododecatriene and the bromine are introduced into the solvent at spaced separate locations and the reaction mixture is stirred vigorously.

DETAILED DESCRIPTION OF THE INVENTION INCLUDING A PREFERRED EMBODIMENT

According to the invention trans, trans, trans- or trans, trans, cis-1,5,9-cyclododecatriene or mixtures thereof can be used as the starting materials. The polar solvents which can be used according to the invention, for example, with advantage, can be lower aliphatic alcohols, such as the lower alkanols e.g., ethanol, n-propanol or isopropanol, butanol, methanol and the like. Glacial acetic acid has also been found particularly suitable as a solvent. Halogen-bearing hydrocarbons, for example, carbon tetrachloride, chloroform, dibromomethane, or ethers, for example, lower alkyl ethers, e.g., diethyl ether, dibutyl ether, can also be used in admixture with the alcohols and/or glacial acetic acid. The temperature employed in the process according to the invention should preferably be maintained above 10° C.

To carry out the method according to the invention the solvent or the mixture of solvents is put in the reaction vessel which is provided with a stirrer and two spatially separated devices for the separate addition of the cyclododecatriene and the bromine.

Approximately 400 to 1000 parts by volume of solvent are used per mol of cyclododecatriene. Bromine and cyclododecatriene are introduced into the solvent through the separate adding devices, a temperature of from 10 to 40° C., preferably, from 20 to 30° C. being maintained in the solvent. However, higher temperatures of up to 80° C. can also be used with only a slight reduction in yield. During the addition of the reactants the reaction mixture is thoroughly mixed. It has been found to be of advantage if from 1 to 5% of the quantity of bromine required in all is introduced into the solvent before beginning the addition of the first cyclododecatriene and this excess of bromine is maintained during the subsequent addition of bromine and cyclododecatriene. Apart from the excess of bromine which may be maintained, cyclododecatriene and bromine should preferably be introduced into the solvent or mixture of solvents in a mol ratio of 1:3.

In the process according to the invention, soon after the addition of the reagents is begun, colorless crystals of hexabromocyclododecane are deposited. Viscous or resin-like deposits do not occur. As soon as the total quantity of bromine and cyclododecatriene has been introduced, the crystals of hexabromocyclododecane can be separated, for example, by filtration, decanting or centrifuging. The method can also be carried out continuously. In this case the crystallized hexabromocyclododecane is drawn off at the bottom of the reaction vessel, as soon as crystallization in the reaction mixture has begun, at the rate at which bromine and cyclododecatriene are introduced into the solvent. A technically advantageous embodiment of the method according to the invention is achieved by re-using the mother liquor remaining after separation of the hexabromocyclododecane as solvent in a subsequent operation of the method.

The hexabromocyclododecane obtained according to the invention is obtained in a high yield and in the form of crystals of a pure white color. These crystals neither need to be washed nor recrystallized, but rather can be used directly after any solvent adhering to them has been dried off, for example, as fire-retarding component in plastics, such as, polyolefins, and other combustible plastics.

The method according to the invention is described in greater detail hereinafter by means of several examples and a comparative example.

Example 1
(According to the invention)

108 parts by weight of trans, trans, cis-1,5,9-cyclododecatriene and 320 parts by weight of bromine were fed with agitation into 630 parts by weight of 96% ethyl alcohol through two spatially separated adding devices over a period of 2½ hours. The temperature was maintained at from 20 to 30° C. during this whole period. The first colorless crystals of hexabromocyclododecane precipitated after the addition of approximately 20 parts by weight of cyclododecatriene. When the addition of the reactants was complete the hexabromocyclododecane was separated from the solvent by filtration. 302 parts by weight (70.6% of theory) of hexabromocyclododecane were obtained. Its melting point was 175° C.

Upon filtration of the hexabromocyclododecane, 540 parts by weight of mother liquor were recovered. 90 parts by weight of 96% ethyl alcohol were added to this mother liquor, whereupon this mixture was then used as a solvent for a new operation. This new operation was carried out as described above. 397 parts by weight (93% of theory) of hexabromocyclododecane with a melting point of 175° C. were obtained. The mother liquor accumulated in this operation was again supplemented by the necessary quantity of ethyl alcohol and used for further operations of the method. This process was repeated seven times more and the yields were between 92 and 98% of the theoretical quantities. The total yield with reference to the cyclododecatriene supplied in these nine runs of the process was 92% of theory. The melting point of the hexabromocyclododecane obtained in each case was 175° C.

Example 2
(According to the invention)

8 parts by weight of bromine were added to 245 parts by weight of 96% ethyl alcohol while stirring. Thereafter 54 parts by weight of trans, trans, cis-1,5,9-cyclododecatriene and 160 parts by weight of bromine were added thereto while stirring through two spatially separated adding devices over a period of 3 hours. The temperature was maintained at from 20 to 30° C. during this whole period. The first crystals of hexabromocyclododecane already began to crystallize out after addition of about 16 parts by weight of the cyclododecatriene. When the addition of the reactants was complete the reaction mixture was stirred for a further 2 hours at 20° C. Thereafter the hexabromocyclododecane was separated from the solvent by filtration and dried at 50° C. 165 parts by weight (77.1% of theory based upon the cyclododecatriene supplied) of the hexabromocyclododecane were obtained. Its melting point was 177° C.

205 parts by weight of mother liquor were recovered when the hexabromocyclododecane was filtered off from the reaction mixture. 40 parts by weight of 96% ethyl alcohol were added to such mother liquor, whereupon such mixture was then used as solvent for a new operation in which again 54 parts by weight of cyclododecatriene were reacted with 160 parts by weight of bromine. 208.5 parts by weight (97.5% of theory) of hexabromocyclododecane with a melting point of 175° C. were obtained. The mother liquor accumulated in this operation (about 215 parts by weight) were again supplemented by the necessary quantity of ethyl alcohol to provide 245 parts by weight and used for a further operation of the process for reaction of 54 parts by weight of cyclododecatriene with 160 parts by weight of bromine. In this run 223 parts by weight (104% of theory) of hexabromocyclododecane with a melting point of 175–176° C. were obtained. The total yield for the three runs based on the cyclododecatriene supplied was 92.8% of theory.

Example 3 (Comparison)

625 parts of weight of ethanol were mixed with 108 parts by weight of trans, trans, cis-1,5,9,-cyclododecatriene and 320 parts by weight of bromine in all added dropwise thereto at a temperature of from 20 to 30° C. After the addition of 35% of the bromine a viscous product was formed in the reaction mixture and resin-like lumps were formed upon the addition of a further 30% of the bromine. Although these lumps made thorough mixing of the reaction mixture difficult, the whole amount of bromine was introduced. The hexabromocyclododecane obtained was then separated by filtration. The product was yellowish in color and was not finely crystalline but rather contained a large number of resin-like lumps. The yield was 268 parts by weight (62.8% of theory) and the melting point of the crystalline components was 173° C.

580 parts by weight of mother liquor were also obtained, which were mixed with 45 parts by weight of ethanol and used for a subsequent operation which was carried out in the same way as that described above. As in the previous operation, viscous products were also formed in this case after the addition of 35% of the bromine. Upon the addition of a further 6% of the bromine, resin-like lumps were formed which only could be partly broken up by extended stirring. When all the bromine had been added, the reaction mixture was filtered. 377 parts by weight of an impure hexabromocyclododecane (88% of theory) with a melting point of 167° C. were obtained.

As shown by the comparison of the examples, when the method according to the invention is carried out colorless crystalline products are obtained directly, while according to the known mode of operation viscous and resin-like products are produced which greatly reduce the yield and purity of the end product.

What is claimed is:
1. In a method of producing hexabromocyclododecane by reacting cyclododecatriene with bromine in the presence of a polar organic solvent selected from the group consisting of lower alkanols, glacial acetic acid, and mixtures of carbon tetrachloride, chloroform, dibromomethane or lower alkyl ethers with the alkanols or the acetic acid, the improvement of introducing the cyclododecatriene and the bromine into the solvent at spatially separated locations and in the absence of halogen carriers and acid binders at a temperature above 10° C. and up to 80° C. while agitating the resulting reaction mixture whereby colorless crystalline hexabromocyclododecane deposits out of the reaction mixture.

2. The method according to claim 1, wherein from 1 to 5% of the quantity of bromine required in all is introduced into the solvent before commencing the addition of the cyclododecatriene and this excess of bromine is maintained during the subsequent addition of bromine and cyclododecatriene.

3. The method according to claim 1, characterized in that the polar solvent is ethanol and cyclododecatriene and bromine are introduced into the solvent in a mol ratio of about 1:3.

4. The method according to claim 1, comprising in addition separating the hexabromocyclododecane produced from the reaction mixture and using the mother liquor remaining after separation of the hexabromocyclododecane as a solvent in a subsequent operation of the method.

5. A process for producing white, crystalline hexabromocyclododecane which comprises introducing cyclododecatriene and bromine in a mol ratio of about 1:3 at spatially separated locations into a polar solvent in the absence of halogen carriers and acid binders while agitating the resulting reaction mixture and while maintaining the mixture at a temperature of from about 20° to 30° C., the polar solvent selected from the group consisting of lower alkanols, glacial acetic acid, and mixtures of carbon tetrachloride, chloroform, dibromomethane or lower alkyl ethers with the alkanols or the acetic acid, and recovering white hexabromocyclododecane crystals from said reaction mixture by mechanical separation.

6. A process according to claim 5 wherein the solvent is a lower alkanol or glacial acetic acid, wherein from 1 to 5% of the total quantity of bromine required is introduced into the solvent before commencing the addition of the cyclododecatriene, and wherein this excess of bromine is maintained during the subsequent addition of bromine and cyclododecatriene.

References Cited

UNITED STATES PATENTS

| | | | |
|---|---|---|---|
| 2,318,323 | 5/1943 | Cunradi et al. | 260—660 |
| 2,601,322 | 6/1952 | Reese | 260—660 |
| 2,765,353 | 10/1956 | Neher | 260—660 |

FOREIGN PATENTS

| | | | |
|---|---|---|---|
| 871,303 | 6/1961 | Great Britain | 260—660 |
| 1,222,049 | 8/1966 | Germany | 260—648 |

HOWARD T. MARS, Primary Examiner